United States Patent
Lee et al.

(10) Patent No.: US 8,895,183 B2
(45) Date of Patent: Nov. 25, 2014

(54) EXTERNAL TERMINAL ASSEMBLY INCLUDING A TERMINAL HOLDER COUPLED TO A PROTECTION CIRCUIT SUBSTRATE AND BATTERY PACK INCLUDING THE SAME

(75) Inventors: Sang-Joo Lee, Yongin-si (KR); Heui-Sang Yoon, Yongin-si (KR); Woo-Choul Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 392 days.

(21) Appl. No.: 13/064,431

(22) Filed: Mar. 24, 2011

(65) Prior Publication Data
US 2012/0034494 A1 Feb. 9, 2012

(30) Foreign Application Priority Data
Aug. 4, 2010 (KR) .................. 10-2010-0075312

(51) Int. Cl.
*H01M 2/04* (2006.01)
*H01M 2/06* (2006.01)
*H01M 2/30* (2006.01)
*H01M 2/34* (2006.01)
*H01M 10/052* (2010.01)

(52) U.S. Cl.
CPC .... *H01M 2/34* (2013.01); *Y02E 60/12* (2013.01); *H01M 10/052* (2013.01); *H01M 2/30* (2013.01)
USPC ............. 429/178; 429/175; 429/185; 429/65; 429/7

(58) Field of Classification Search
USPC ............. 429/7, 159, 158, 100, 162, 176, 185, 429/99, 178, 175, 65
See application file for complete search history.

(56) References Cited

U.S. PATENT DOCUMENTS

| | | | |
|---|---|---|---|
| 6,432,575 B1 * | 8/2002 | Yamagami | 429/100 |
| 6,451,474 B1 * | 9/2002 | Kozu et al. | 429/100 |
| 2004/0029000 A1 * | 2/2004 | Morita et al. | 429/162 |
| 2009/0305117 A1 | 12/2009 | Koh et al. | |
| 2010/0178536 A1 | 7/2010 | Kwak et al. | |

FOREIGN PATENT DOCUMENTS

| | | | | |
|---|---|---|---|---|
| JP | 2004327342 A | * | 11/2004 | H01M 2/10 |
| KR | 10-2008-0045371 A | | 5/2008 | |
| KR | 10-2008-0049645 A | | 6/2008 | |
| KR | 10-2009-0078181 A | | 7/2009 | |
| KR | 10-2009-0126869 A | | 12/2009 | |
| KR | 10-2010-0070471 A | | 6/2010 | |
| KR | 10 2010-0082532 A | | 7/2010 | |
| WO | WO-2006/067918 A1 | * | 6/2006 | H01M 2/10 |

OTHER PUBLICATIONS

Machine Translation of: JP 2004/327342A, Nakano, Nov. 18, 2004.*
Korean Office Action in KR 10 2010-0075312, dated Oct. 28, 2011 (Lee, et al.).

* cited by examiner

*Primary Examiner* — Kenneth Douyette
(74) *Attorney, Agent, or Firm* — Lee & Morse, P.C.

(57) ABSTRACT

An external terminal assembly for establishing a connection between a battery pack and an electrical connector of an external device and a battery pack including the same, the external terminal assembly including an external terminal, the external terminal being electrically connectable to the electrical connector of the external device; a terminal holder on a protection circuit substrate, the terminal holder fixing a position of the external terminal; and a top case covering the protection circuit substrate and the terminal holder, the top case including holes exposing the external terminal.

17 Claims, 6 Drawing Sheets

EXTERNAL TERMINAL ASSEMBLY INCLUDING A TERMINAL HOLDER COUPLED TO A PROTECTION CIRCUIT SUBSTRATE AND BATTERY PACK INCLUDING THE SAME

BACKGROUND

1. Field

Embodiments relate to an external terminal assembly and a battery pack including the same.

2. Description of the Related Art

Recently, compact and light portable electric/electronic device, e.g., a cellular phone, a notebook computer, or a camcorder, are widely being developed and produced. Such portable electric/electronic devices may include a battery pack so as to be able to be operated at a place where an additional power source is not provided.

Battery packs may employ secondary batteries capable of being charged and discharged in view of an economical aspect. Secondary batteries may include, e.g., nickel-cadmium (Ni—Cd) batteries, nickel-hydrogen (Ni—H) batteries, lithium (Li) batteries, lithium ion (Li-ion) secondary batteries, etc. For example, Li-ion secondary batteries may have an operation voltage that is about three times greater than that of Ni—Cd batteries or Ni-MH batteries and are widely used as power sources of portable electronic devices. In addition, Li-ion secondary batteries are widely used because of high density per unit weight.

Secondary batteries may use a Li-based oxide as a positive active material and a carbon material as a negative active material. In general, secondary batteries may include, e.g., liquid electrolyte batteries and polymer electrolyte batteries according to the types of electrolytes. A battery using a liquid electrolyte may be designated as a Li-ion battery and a battery using a polymer electrolyte may be designated as a Li-polymer battery.

SUMMARY

Embodiments are directed to an external terminal assembly and a battery pack including the same.

At least one of the above and other features and advantages may be realized by providing an external terminal assembly for establishing a connection between a battery pack and an electrical connector of an external device, the external terminal assembly including an external terminal, the external terminal being electrically connectable to the electrical connector of the external device; a terminal holder on a protection circuit substrate, the terminal holder fixing a position of the external terminal; and a top case covering the protection circuit substrate and the terminal holder, the top case including holes exposing the external terminal.

The terminal holder may be coupled to the protection circuit substrate.

The external terminal assembly may further include a rib at an internal side of the top case, the rib fixing a position of the protection circuit substrate.

The external terminal assembly may further include a holder guide portion at an internal side of the top case, the holder guide supporting at least one side of the terminal holder.

The external terminal may have a depressed shape into which the electrical connector of the external device is insertable.

The external terminal assembly may include a plurality of the external terminals spaced apart from one another, and the terminal holder may include a barrier wall between the external terminals.

The terminal holder may include an inserting jaw accommodating the external terminal.

The terminal holder may include a protrusion, the protection circuit substrate may include a groove, and the protrusion may be coupled to the groove.

At least one of the above and other features and advantages may also be realized by providing a battery pack that is electrically connectable to an electrical connector of an external device, the battery pack including a bare cell; a protection circuit substrate including a protection element mounted thereon for controlling charging/discharging of the bare cell; an external terminal assembly electrically connectable to the external device; a terminal holder on the protection circuit substrate, the terminal holder fixing a position of the external terminal assembly; and a top case covering the protection circuit substrate and the terminal holder, the top case including holes exposing an external terminal of the electrode terminal assembly.

The battery pack may further include a holder guide portion at an internal side of the top case, the holder guide portion supporting at least one side of the terminal holder.

The external terminal may have a depressed shape into which the electrical connector of the external device is insertable.

The external terminal assembly may include a plurality of the external terminals spaced apart from one another, and the terminal holder may include a barrier wall between the external terminals.

The battery pack may further include a rib at an internal side of the top case, the rib fixing a position of the protection circuit substrate.

The terminal holder may include an inserting jaw accommodating the external terminal.

The terminal holder may include a protrusion, the protection circuit substrate may include a groove, and the protrusion may be coupled to the groove.

A surface of the terminal holder may extend below an upper surface of the protection circuit substrate toward the bare cell.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
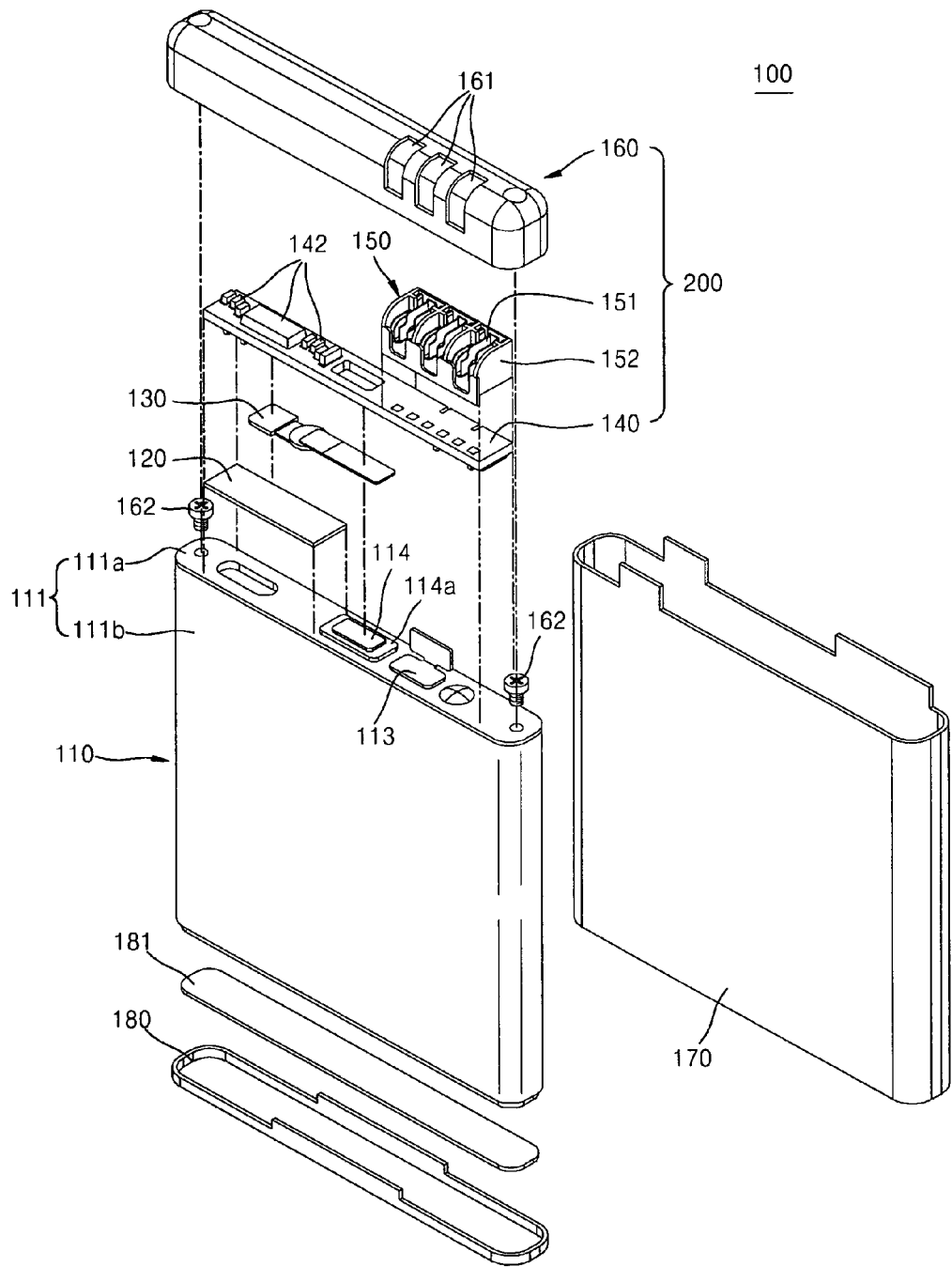
FIG. 1 illustrates an exploded perspective view of a battery pack according to an embodiment.

Korean Patent Application No. 10-2010-0075312, filed on Aug. 4, 2010, in the Korean Intellectual Property Office, and entitled: "External Terminal Assembly and Battery Pack Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

As used herein, the singular forms 'a', 'an', and 'the' are intended to include the plural forms as well, unless the context clearly indicates otherwise. It will be further understood that the terms 'comprises' and/or 'comprising,' when used in this specification, specify the presence of stated features, steps, operations, elements, and/or components, but do not preclude the presence or addition of one or more other features, steps, operations, elements, components, and/or groups thereof. It will be understood that, although the terms 'first', 'second', 'third', etc., may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the inventive concept.

Figure 2:
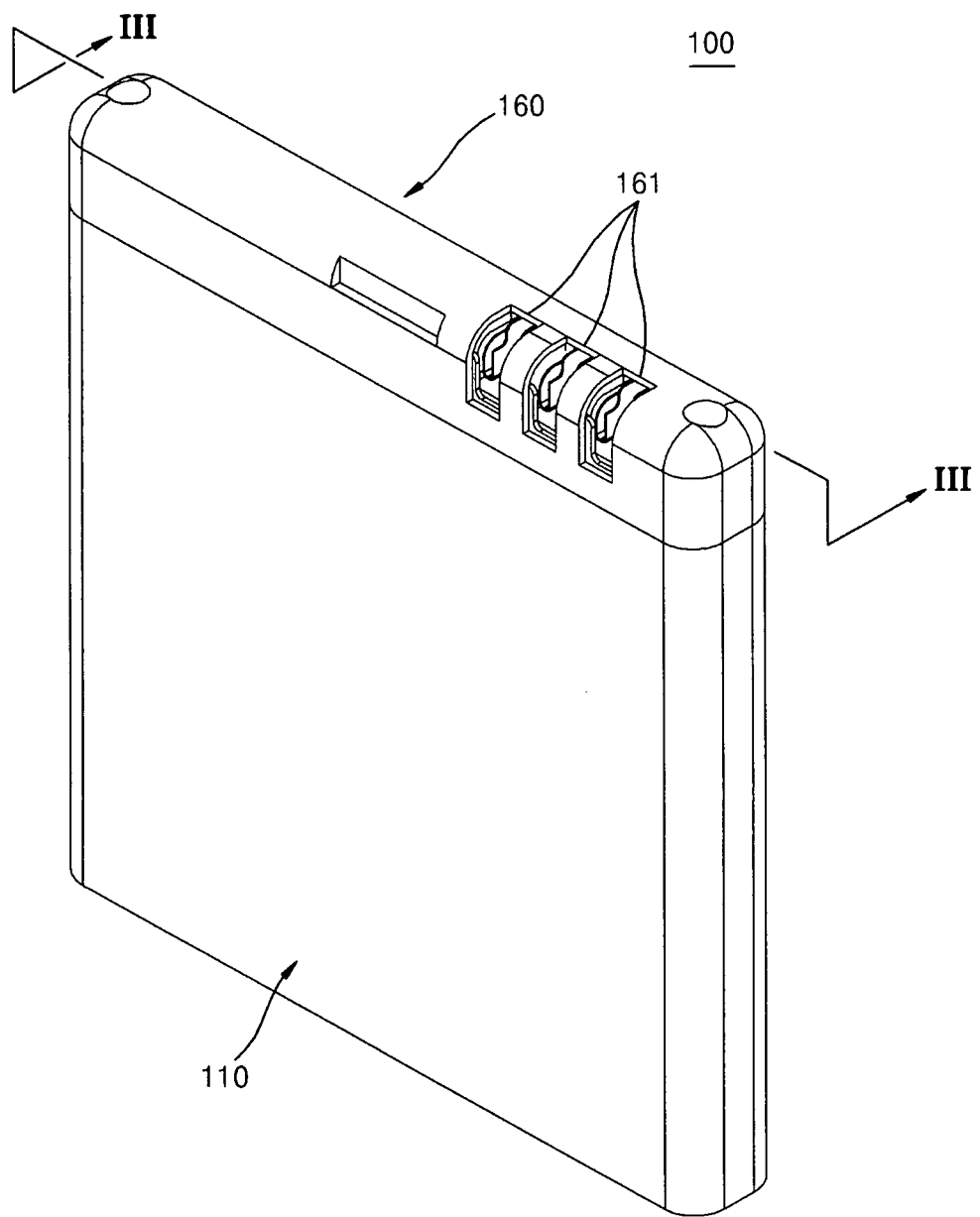
FIG. 2 illustrates a schematic perspective view of the battery pack of FIG. 1.

FIG. 1 illustrates an exploded perspective view of a battery pack according to an embodiment. FIG. 2 illustrates a perspective view of the battery pack of FIG. 1. Referring to FIGS. 1 and 2, the battery pack 100 may include a bare cell 110, a protection circuit substrate 140 on which a plurality of protection elements 142 may be mounted, an external terminal module 150, and a top case 160. In an implementation, an external terminal assembly 200 may include the protection circuit substrate 140, the external terminal module 150, and the top case 160.

The bare cell 110 may include an electrode assembly (not shown) and a sealing portion 111 accommodating the electrode assembly. The electrode assembly may be formed in a jelly roll shape by interposing a separator (not shown) between a positive electrode plate (not shown) and a negative electrode plate (not shown) so as to form a stacked structure and then rolling the stacked structure.

The sealing portion 111 may include a cap plate 111a and a can 111b. The can 111b may have an open end. The cap plate 111a may be disposed at a side of the can 111b so as to cover the open end of the can 111b. The sealing portion 111 may be formed of a conductive material, e.g., aluminum.

An electrode terminal 114 may be disposed on the cap plate 111a. An insulator 114a may be disposed between the electrode terminal 114 and the cap plate 111a. A connection terminal 113 may be disposed on the cap plate 111a. The negative electrode plate of the electrode assembly may be electrically connected to the electrode terminal 114, and the positive electrode plate of the electrode assembly may be electrically connected to the sealing portion 111.

In an implementation, the electrode terminal 114 may be connected to a negative electrode of the bare cell 110 and the sealing portion 111 may be connected to a positive electrode of the bare cell 110, but the embodiments are not limited thereto. For example, the electrode terminal 114 may be connected to the positive electrode of the bare cell 110, and the sealing portion 111 may be connected to the negative electrode of the bare cell 110, when desired.

The plurality of protection elements 142 may be mounted on a surface of the protection circuit substrate 140. The protection element 142 may control overcharging and overdischarging of the bare cell 110. The protection element 142 may selectively include integrated circuits and safety elements such as a passive element, e.g., a resistor or a capacitor, and an active element, e.g., a field effect transistor (FET).

The protection circuit substrate 140 may be electrically connected to the bare cell 110. A negative electrode of the protection circuit substrate 140 may be connected to the negative electrode of the bare cell 110 via the electrode terminal 114; and a positive electrode of the protection circuit substrate 140 may be connected to the positive electrode of the bare cell 110 via the connection terminal 113. A positive temperature coefficient (PTC) element 130 may be electrically connected between the negative electrode of the protection circuit substrate 140 and the electrode terminal 114. The PTC element 130, e.g., a control element, may interrupt an electrical path between the negative electrode of the protection circuit substrate 140 and the electrode terminal 114 when current excessively flows therethrough or when a temperature thereof is excessively increased. Thus, the PTC element 130 may prevent combustion or explosion of the battery pack 100.

An insulating tape 120 may be disposed on the cap plate 111a so as to prevent a short circuit between the PTC element 130 and the bare cell 110.

The external terminal module 150 may include a plurality of external terminals 151 and a terminal holder 152 for fixing a position of the external terminals 151. The external terminal module 150 may be coupled to the protection circuit substrate 140. The plurality of external terminals 151 may be spaced apart from one another at predetermined intervals. In an implementation, only one external terminal 151 may be included.

The external terminals 151 may electrically connect the battery pack 100 to an external device (not shown), e.g., may be configured to establish an electrical connection between the battery pack 100 and the external device. The external terminals 151 may be depressed connector type terminals in which electrical connectors (not shown) of the external device may be inserted. The terminal holder 152 may fix a position of the external terminals 151; and an upper portion of the terminal holder 152 may be open so that the external terminals 151 are exposed to the outside. A detailed configuration of the external terminal module 150 will be described below with reference to FIGS. 5 and 6.

The top case 160 may have a size corresponding to that of the cap plate 111a. The top case 160 may have a hexagonal or hexahedral shape. A lower portion of the top case 160 may cover the external terminal module 150. A plurality of openings 161 may be formed in the top case 160 so as to expose the external terminals 151 to the outside. When establishing a connection, the electrical connectors of the external device may be inserted into the external terminals 151 exposed through the openings 161. The top case 160 may completely cover the external terminal module 150. Thus, even if an external impact is applied to the battery pack 100, the external terminals 151 may be prevented from being separated from the top case 160. In addition, the top case 160 may protect the protection circuit substrate 140 from an external impact and pollutants. After the top case 160 is coupled to the protection circuit substrate 140, the bare cell 110 and the top case 160 may be surrounded by a label 170.

The bare cell 110 may be further protected by being surrounded by an auxiliary case 180. A double-sided tape 181 may be disposed between the auxiliary case 180 and the bare cell 110 so as to couple the auxiliary case 180 to the bare cell 110.

The external terminal assembly 200 may include the protection circuit substrate 140, the external terminal module 150 coupled to the protection circuit substrate 140, and the top case 160.

Figure 3:
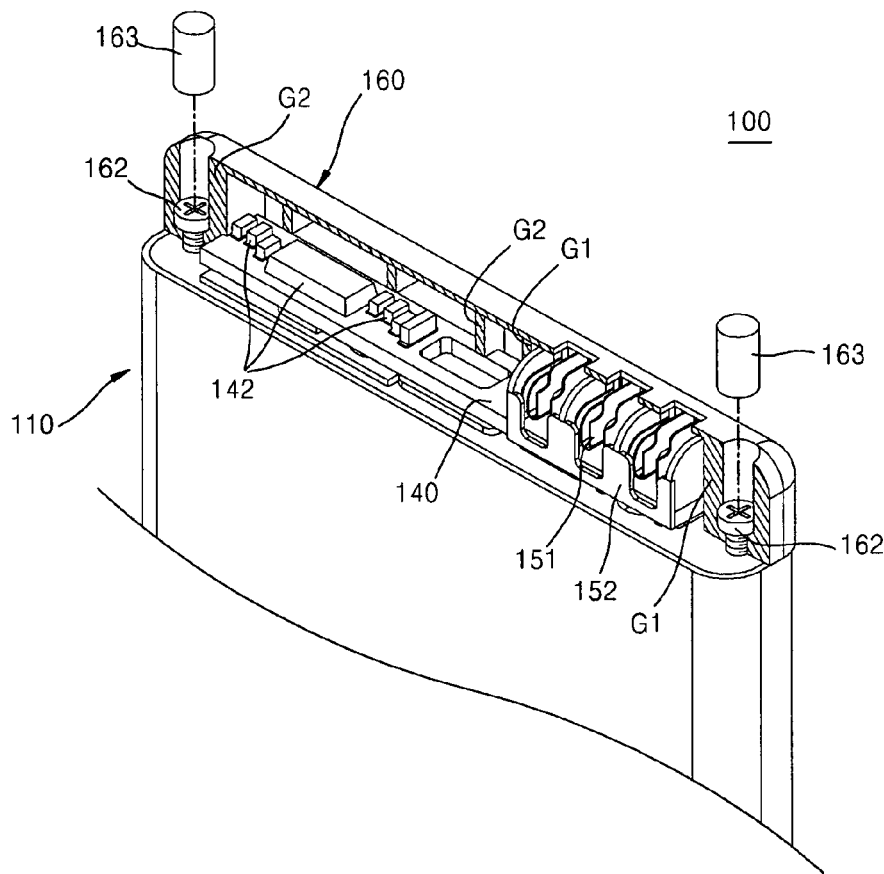
FIG. 3 illustrates a perspective view of an upper portion of the battery pack of FIG. 2 taken along a line of FIG. 2.
Figure 4:
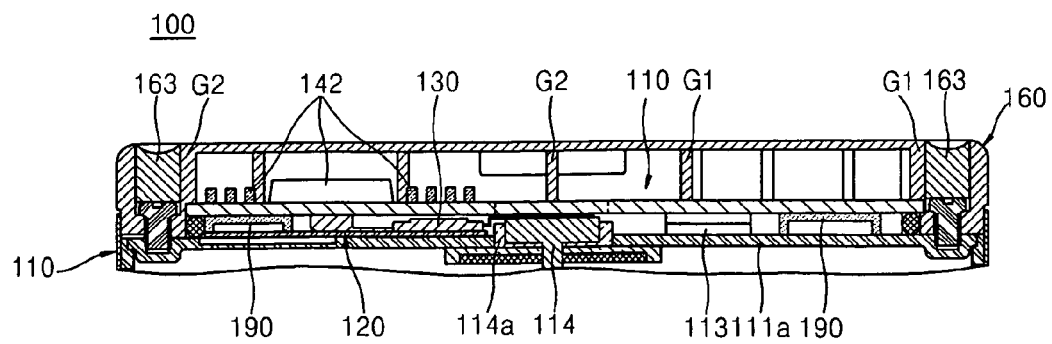
FIG. 4 illustrates a cross-sectional view of the upper portion of the battery pack of FIG. 3.

A detailed configuration of the top case 160 will be described with reference to FIGS. 3 and 4. FIG. 3 illustrates a perspective view of an upper portion of the battery pack taken along a line III-III of FIG. 2. FIG. 4 illustrates a cross-sectional view of the upper portion of the battery pack.

The protection circuit substrate 140 may be disposed on the cap plate 111a of the bare cell 110. As described above, the protection circuit substrate 140 may be electrically connected to the bare cell 110. The external terminal module 150 may be disposed at a side of the protection circuit substrate 140. The top case 160 may cover an upper portion of the bare cell 110 including the external terminal module 150. A plurality of coupling holes may be respectively formed in ends of the top case 160 so as to facilitate coupling of the top case 160 and the bare cell 110. A screw bolt 162 may be inserted into each of the coupling holes. The screw bolts 162 may be fastened into the cap plate 111a so as to couple the top case 160 and the bare cell 110.

As described above, the top case 160 may be coupled to the bare cell 110 by using the screw bolts 162, but the embodiments are not limited thereto. For example, the top case 160 may be coupled to the bare cell 110 through hooking, adhesion, taping, or the like.

The top case 160 may entirely cover the external terminal module 150. The openings 161 may correspond to the external terminals 151 so as to expose the external terminals 151 to the outside. A holder guide portion G1 may be formed at an internal side of the top case 160. The holder guide portion G1 may support at least one side of the terminal holder 152. The holder guide portion G1 may prevent the terminal holder 152 from moving and may ease assembly of the terminal holder 152.

In an implementation, two holder guide portions G1 may contact respective sides of the terminal holder 152, but the embodiments are not limited thereto. For example, only one holder guide portion G1 may be included and may contact one side of the terminal holder 152 so as to support the terminal holder 152.

A rib G2 may be formed at an internal side of the top case 160. The rib G2 may support an upper surface of the protection circuit substrate 140 and may firmly couple the protection circuit substrate 140 to the bare cell 110. In addition, the rib G2 may fix a position of the protection circuit substrate 140 so as to prevent the protection circuit substrate 140 from moving. At least one rib G2 may support the upper surface of the protection circuit substrate 140. The position of the rib G2 illustrated in FIG. 3 is just an example, and the embodiments are not limited thereto.

A plug 163 may block each of the coupling holes into which the screw bolts 162 are inserted; and a supporting member 190 may support the protection circuit substrate 140.

Figure 5:
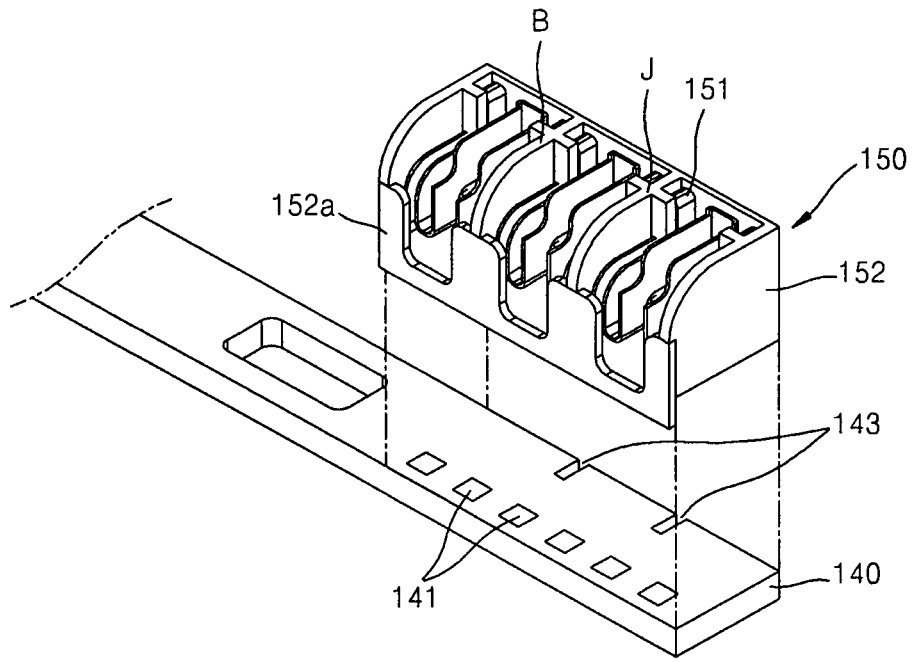
FIG. 5 illustrates an enlarged perspective view of a terminal holder of the battery pack of FIG. 1.
Figure 6:
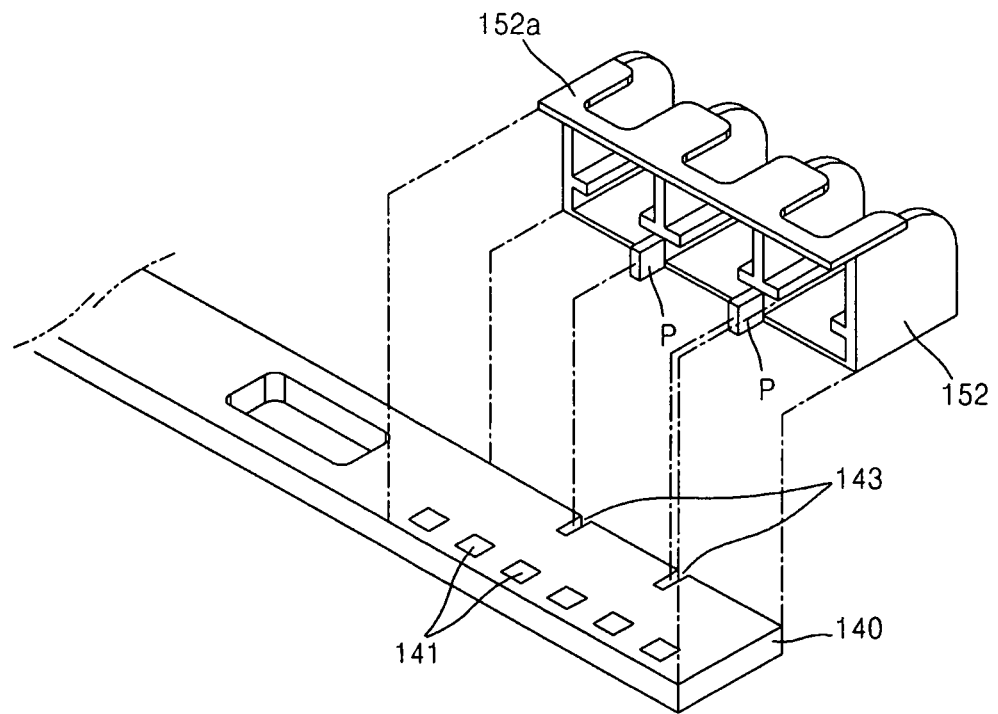
FIG. 6 illustrates an enlarged exploded perspective view of a connection between the terminal holder of FIG. 5 and a protection circuit substrate.

FIG. 5 illustrates an enlarged perspective view of a terminal holder of the battery pack of FIG. 1. FIG. 6 illustrates an enlarged exploded perspective view of a connection between the terminal holder of FIG. 5 and the protection circuit substrate. In FIG. 6, the external terminals 151 are omitted for convenience of description. Referring to FIGS. 5 and 6, the terminal holder 152 may include at least one external terminal 151.

When the terminal holder 152 includes the plurality of the external terminals 151, a barrier wall B may be interposed between the external terminals 151. An upper portion of the terminal holder 152 may be open so as to expose the external terminals 151. A lower portion of the terminal holder 152 may be open so that the external terminals 151 and the protection circuit substrate 140 may be electrically connected.

A plurality of inserting jaws J may be formed in the terminal holder 152. The external terminals 151 may be fixed to the terminal holder 152 via the inserting jaws J. For example, the inserting jaws J may correspond to ends of the external terminal 151. Thus, the ends of the external terminal 151 may be coupled to the inserting jaws J.

The external terminal module 150 in which the external terminals 151 are coupled to the terminal holder 152 may be disposed at an upper surface of the protection circuit substrate 140. A front surface of the terminal holder 152 may extend toward the bare cell 110. Hereinafter, the front surface of the extending terminal holder 152 is called an extending surface 152a. In an implementation, the extending surface 152a of the terminal holder 152 may extend below a top or upper surface of the protection circuit substrate 140 toward the bare cell 110.

As illustrated in FIG. 6, a plurality of protrusions P may be formed at a lower side of a rear surface of the terminal holder 152. The protrusions P may be coupled to a plurality of corresponding grooves 143 in the protection circuit substrate 140, thereby facilitating coupling between the protection circuit substrate 140 and the terminal holder 152. In an implementation, only one protrusion P may be included. The external terminals 151 may be bonded to a plurality of bonding positions 141 on the protection circuit substrate 140.

As described above, the extending surface 152a may be the front surface of the terminal holder 152 and the protrusions P may be formed at the lower side of the rear surface of the terminal holder 152. Thus, the external terminal module 150 may be easily and stably disposed on the protection circuit substrate 140. For example, after the external terminal module 150 is disposed with the extending surface 152a contacting the protection circuit substrate 140, the protrusions P may be coupled to the grooves 143. The external terminals 151 may already be fixed to the terminal holder 152 if the terminal holder 152 is disposed on the protection circuit substrate 140. Thus, the external terminals 151 may be correctly bonded to the bonding positions 141.

As described above, the external terminal module 150 may be coupled to the protection circuit substrate 140 via the extending surface 152a and the protrusions P. Thus, even if an external impact is applied to the battery pack 100, the external terminal module 150 may not be separated from the protection circuit substrate 140.

As described above, the protrusions P may be formed at the lower side of the rear surface of the terminal holder 152, but the embodiments are not limited thereto. As long as the external terminal module 150 is coupled to the protection circuit substrate 140, the shape and the number of the protrusions P are not limited.

As described above, the extending surface 152a may be the front surface of the terminal holder 152, and the protrusions P may be formed in the rear surface of the terminal holder 152, but the embodiments are not limited thereto. For example, the protrusions P may be formed in the front surface of the terminal holder 152; and the extending surface 152a may be the rear surface of the terminal holder 152. Alternatively, the extending surface 152a may not be formed.

Figure 7:
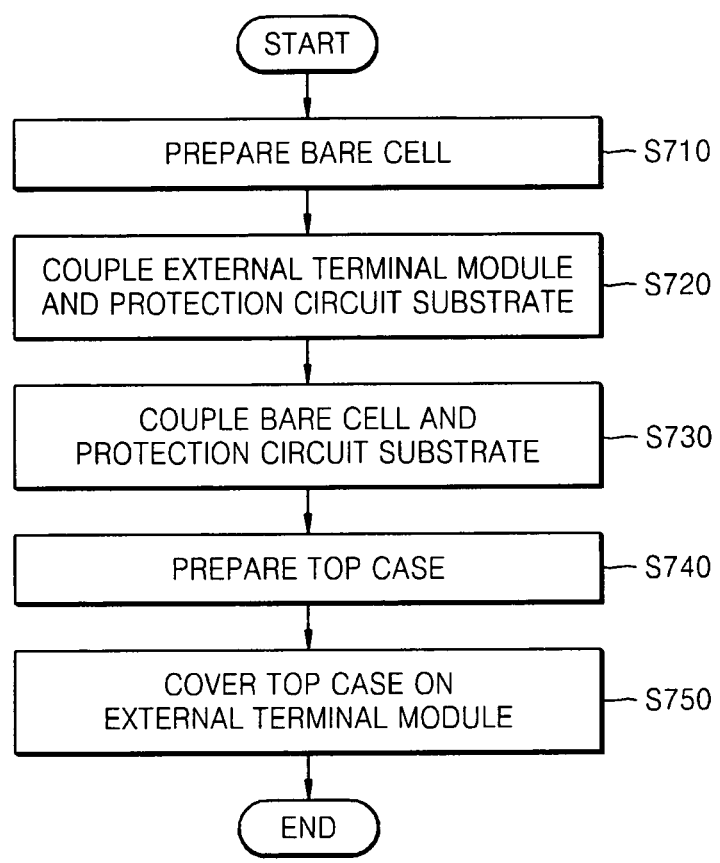
FIG. 7 illustrates a flowchart of a process for manufacturing a battery pack according to an embodiment.

Hereinafter, a method of manufacturing the battery pack 100 will be described with reference to FIG. 7. FIG. 7 illustrates a flowchart of a process for manufacturing a battery pack according to an embodiment.

In Step S710, the bare cell 110 accommodating the electrode assembly may be prepared. Referring to FIG. 1, the electrode assembly may be manufactured by winding the stacked structure in which the positive electrode plate, the negative electrode plate, and the separator are stacked. The electrode assembly may then be accommodated in the can 111b along with the electrolyte.

In Step S720, the external terminal module 150 may be coupled to the protection circuit substrate 140. A process for coupling the external terminals 151 to the protection circuit substrate 140 will be described below with reference to FIG. 8.

In Step S730, the bare cell 110 and the protection circuit substrate 140 may be coupled to each other. The protection circuit substrate 140 may be disposed on the bare cell 110. Thus, the protection circuit substrate 140 may be electrically connected to the bare cell 110. Then, the PTC element 130 may be interposed between the protection circuit substrate 140 and the bare cell 110. The negative electrode of the protection circuit substrate 140 and the negative electrode of the bare cell 110 may be electrically connected through the PTC element 130; and the positive electrode of the protection circuit substrate 140 and the positive electrode of the bare cell 110 may be electrically connected through the connection terminal 113.

In Step S740, the top case 160 may be prepared. The top case 160 may be manufactured by, e.g., injection molding. The top case 160 may be formed of a resin material, e.g., polycarbonate. The top case 160 may have a size that may sufficiently accommodate the protection circuit substrate 140 and may have a hexagonal or hexahedral shape. A lower portion of the top case 160 may be open. As described above, the holder guide portion G1 and the rib G2 may be formed at internal sides of the top case 160.

In Step S750, the top case 160 may be disposed on the protection circuit substrate 140 to which the external terminal module 150 is coupled. Ends of the top case 160 may be fixed to the bare cell 110 by the screw bolts 162.

The holder guide portion G1 for guiding the external terminal module 150 may be formed at an internal side of the top case 160. Accordingly, after the top case 160 is disposed in such a way that the holder guide portion G1 corresponds to the external terminal module 150, the external terminal module 150 may be covered. The holder guide portion G1 may contact at least one side of the external terminal module 150.

Coupling between the top case 160 and the external terminal module 150 may be enhanced due to the holder guide portion G1. The top case 160, having a shape that may cover the whole terminal holder 152, may prevent the terminal holder 152 from being separated.

When the top case 160 covers the external terminal module 150, the rib G2 formed at an internal side of the top case 160 may be in contact with the protection circuit substrate 140. The rib G2 may support the protection circuit substrate 140 from above; and the protection circuit substrate 140 may closely contact the bare cell 110.

Figure 8:
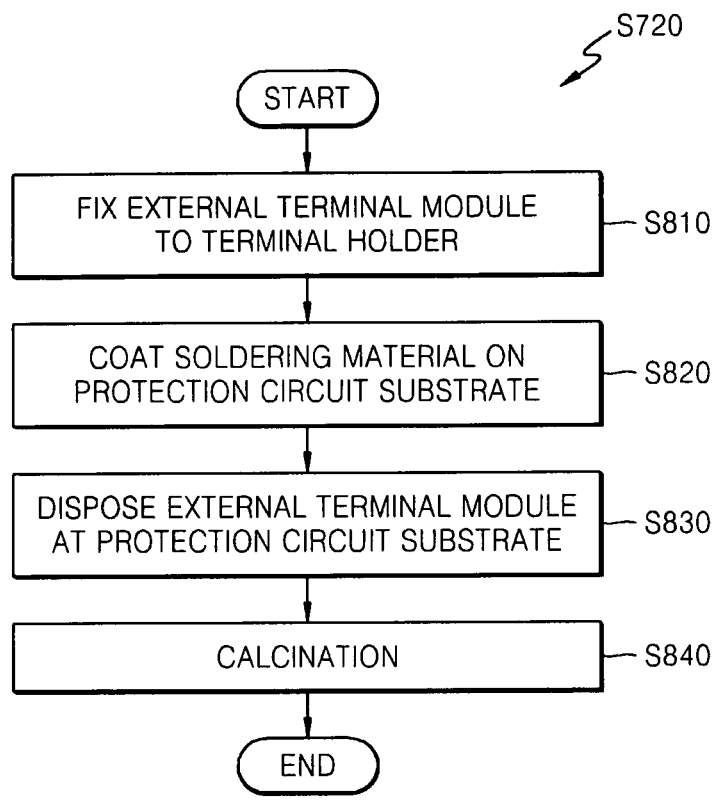
FIG. 8 illustrates a flowchart of a process for coupling a protection circuit substrate and an external terminal module according to an embodiment.

Hereinafter, a process for coupling the protection circuit substrate 140 to the external terminal module 150, e.g., Step S720, will be described with reference to FIG. 8. FIG. 8 illustrates a flowchart for explaining Step S720 in more detail.

In Step S810, the external terminal module 150 may be formed by fixing the external terminal 151 to the terminal holder 152. The inserting jaws J may be formed in the terminal holder 152 so as to fix a position of the external terminals 151. The inserting jaws J may correspond to ends of the external terminals 151. Thus, ends of the external terminals 151 may be coupled to the inserting jaws J and fixed. When a plurality of the external terminals 151 are included, the barrier wall B may be formed between the external terminals 151, thereby preventing a short circuit between the external terminals 151.

In Step 820, a plurality of soldering materials may be coated on the bonding positions 141 corresponding to the external terminals 151 on the protection circuit substrate 140. The soldering material may include any one of various suitable kinds of soldering creams used in a reflow process.

In Step S830, the external terminal module 150 may be disposed on a surface of the protection circuit substrate 140. Then, the external terminals 151 may be positioned on the respective bonding positions 141 formed in the protection circuit substrate 140. The terminal holder 152 of the external terminal module 150 may be easily and stably coupled to the protection circuit substrate 140 through the extending surface 152a and the protrusions P. The extending surface 152a and the protrusions P may function as a guide when the external terminal module 150 is disposed on the protection circuit substrate 140. In addition, even if an external impact is applied to the external terminal module 150, the extending surface 152a and the protrusions P may prevent the external terminal module 150 from moving on the protection circuit substrate 140.

The extending surface 152a may be the front surface of the terminal holder 152 and the protrusions P may be formed at the lower side of the rear surface of the terminal holder 152. Thus, the external terminal module 150 may be easily and stably disposed on the protection circuit substrate 140 by using the extending surface 152a and the protrusions P. In addition, the external terminals 151 may already be fixed to the terminal holder 152 in Step S711. Thus, if the terminal holder 152 is disposed on the protection circuit substrate 140, the external terminals 151 may be correctly bonded to the bonding positions 141. Accordingly, the external terminals 151 may be prevented from separating from the protection circuit substrate 140.

In Step S840, a calcination process may be performed on the protection circuit substrate 140 on which the external terminal module 150 is disposed. The external terminals 151 may be electrically connected to the protection circuit substrate 140 through the calcination.

In the descriptions above, the process for manufacturing the battery pack 100 has been described with reference to FIGS. 7 and 8. However, a process for manufacturing the external terminal assembly 200 is not limited thereto.

By way of review, secondary batteries may undergo a reliability test evaluating impact stability prior to being installed in an electronic product. Secondary batteries should include external terminals in order to establish a connection with and supply power to an external device. According to the embodiments, even if an external impact, e.g., an impact due to a drop, is applied to a secondary battery, a surface contact between an external terminal of the secondary battery and the external device may be maintained. Thus, an electrical connection between the secondary battery and the external device may have improved stability.

According to the embodiments, a process for coupling a protection circuit substrate and a terminal holder may be simplified, and a reflow process may be applied. For example, a welding process may not be necessary, thereby preventing generation of defects due to the welding process and reducing a manufacturing time.

Furthermore, an assembly of a protection circuit substrate and a terminal holder may be commoditized or modularized, thereby reducing a manufacturing cost.

According to the one or more of the above embodiments, a protection circuit substrate and an external terminal module may be easily coupled to each other. In addition, a top case may completely cover the external terminal module. Thus, the external terminal module may be prevented from separating from a battery pack, thereby minimizing defects of the battery pack.

The embodiments provide an external terminal assembly having structure capable of easily being manufactured, and a battery pack including the external terminal assembly.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An external terminal assembly for establishing a connection between a battery pack and an electrical connector of an external device, the external terminal assembly comprising:
   an external terminal, the external terminal being electrically connectable to the electrical connector of the external device;
   a terminal holder on a protection circuit substrate, the terminal holder fixing a position of the external terminal; and
   a top case covering the protection circuit substrate and the terminal holder, the top case including holes exposing the external terminal, and the top case being configured to attach to a top surface of a cap plate of a bare cell,
   wherein:
      the terminal holder includes a protrusion,
      the protection circuit substrate includes a groove,
      the protrusion is coupled to the groove, and
      an extending surface of the terminal holder extends below an upper surface of the protection circuit substrate toward the bare cell, the extending surface being different from the protrusion.

2. The external terminal assembly as claimed in claim 1, wherein the terminal holder is coupled to the protection circuit substrate.

3. The external terminal assembly as claimed in claim 1, further comprising a rib at an internal side of the top case, the rib fixing a position of the protection circuit substrate.

4. The external terminal assembly as claimed in claim 1, further comprising a holder guide portion at an internal side of the top case, the holder guide supporting at least one side of the terminal holder.

5. The external terminal assembly as claimed in claim 1, wherein the external terminal has a depressed shape into which the electrical connector of the external device is insertable.

6. The external terminal assembly as claimed in claim 1, wherein:
   the external terminal assembly includes a plurality of the external terminals spaced apart from one another, and
   the terminal holder includes a barrier wall between the external terminals.

7. The external terminal assembly as claimed in claim 1, wherein the terminal holder includes an inserting jaw accommodating the external terminal.

8. The external terminal assembly as claimed in claim 1, wherein:
   the extending surface of the terminal holder extends below the upper surface of the protection circuit substrate at one outer side of the protection circuit substrate; and
   the groove of the protection circuit substrate is at another outer side of the protection circuit substrate, the other outer side being opposite to the one outer side.

9. A battery pack that is electrically connectable to an electrical connector of an external device, the battery pack comprising:
   a bare cell including a cap plate including a top surface;
   a protection circuit substrate including a protection element mounted thereon for controlling charging/discharging of the bare cell;
   an external terminal assembly electrically connectable to the external device;
   a terminal holder on the protection circuit substrate, the terminal holder fixing a position of the external terminal assembly; and
   a top case covering the protection circuit substrate and the terminal holder, the top case including holes exposing an external terminal of the electrode terminal assembly, and the top case being attached to the top surface of the cap plate,
   wherein:
      the terminal holder includes a protrusion,
      the protection circuit substrate includes a groove,
      the protrusion is coupled to the groove, and
      an extending surface of the terminal holder extends below an upper surface of the protection circuit substrate toward the bare cell, the extending surface being different from the protrusion.

10. The battery pack as claimed in claim 9, wherein:
   the extending surface of the terminal holder extends below the upper surface of the protection circuit substrate at one outer side of the protection circuit substrate; and
   the groove of the protection circuit substrate is at another outer side of the protection circuit substrate, the other outer side being opposite to the one outer side.

11. The battery pack as claimed in claim 9, further comprising a holder guide portion at an internal side of the top case, the holder guide portion supporting at least one side of the terminal holder.

12. The battery pack as claimed in claim 9, wherein the external terminal has a depressed shape into which the electrical connector of the external device is insertable.

13. The battery pack as claimed in claim 9, wherein:
   the external terminal assembly includes a plurality of the external terminals spaced apart from one another, and the terminal holder includes a barrier wall between the external terminals.

14. The battery pack as claimed in claim 9, further comprising a rib at an internal side of the top case, the rib fixing a position of the protection circuit substrate.

15. The battery pack as claimed in claim 9, wherein the terminal holder includes an inserting jaw accommodating the external terminal.

16. The external terminal assembly as claimed in claim 8, wherein the top case only exposes the external terminal.

17. The battery pack as claimed in claim 10, wherein the top case only exposes the external terminal.

* * * * *